(No Model.)
H. A. FRASCH.
METHOD OF AND APPARATUS FOR REFINING ASPHALT.
No. 581,546. Patented Apr. 27, 1897.
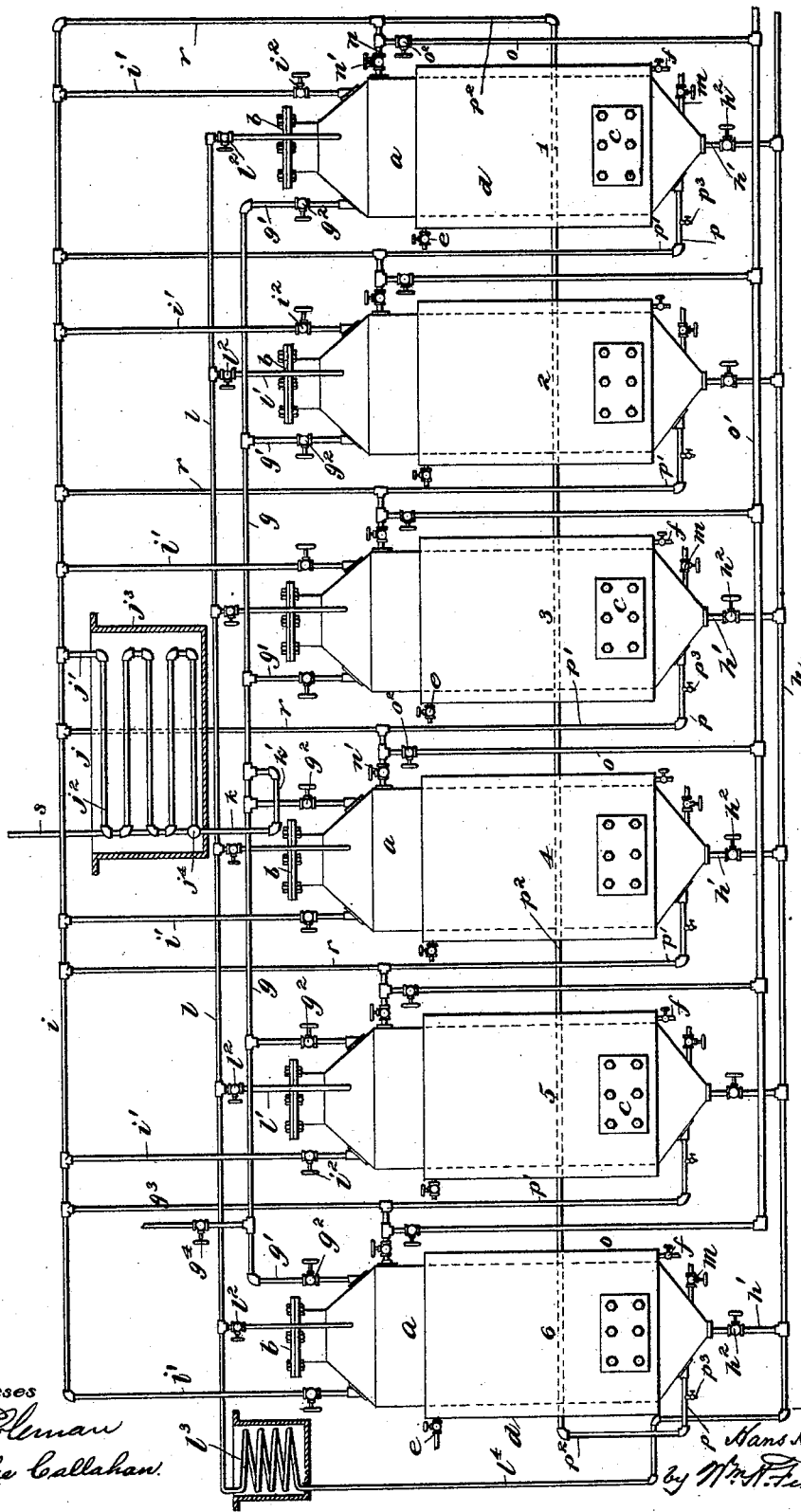

UNITED STATES PATENT OFFICE.

HANS A. FRASCH, OF NEW YORK, N. Y.

METHOD OF AND APPARATUS FOR REFINING ASPHALT.

SPECIFICATION forming part of Letters Patent No. 581,546, dated April 27, 1897.

Application filed October 23, 1896. Serial No. 609,836. (No model.)

*To all whom it may concern:*

Be it known that I, HANS A. FRASCH, a citizen of the United States, residing at New York, in the county of New York and State of New York, have invented a certain new and useful Improvement in Methods of and Apparatus for Refining Asphalt, of which the following is a full, clear, and exact description.

The primary object of this invention is to provide for the economical and exhaustive extraction of the bitumen or asphalt from bituminous rock, such as is found in Uvalde county, Texas, but the invention is applicable also to the extraction of cotton-seed oil and linseed-oil and for other purposes.

The principle of the invention is embodied in subjecting the crushed rock to the action of heat and benzin or like solvent, the solvent being maintained at its boiling-point and such boiling-point being lower than the boiling-point of the bitumen or asphalt. The rock is crushed and then placed in vessels which are provided with connections by means of which the solvent and the matter dissolved out of the rock thereby may be carried in solution from one vessel to the other in series and the solution finally concentrated in the last vessel in the series, the vaporized solvent being constantly collected from the several vessels and condensed, and thence returned from one vessel successively to the others of the series of vessels, so that after the series of vessels has been once charged with the solvent and the supply of solvent cut off the vessels are further charged with the solvent by this condensation and return of its vapors. Heretofore in the treatment of such rock it has been customary to add fresh solvent as the latter evaporates, and this is not only costly in solvent, but prolongs the process of extraction. By my invention of a continuous process and the recovery and condensation of the vapors of the solvent and the subsequent use in the process of such condensed vapors I not only economize in the quantity of solvent used, but also effect a great saving of time in the process and consequently gain an increased daily output and a more thorough—in fact, an exhaustive—extraction of the bitumen or asphalt.

In the accompanying drawing, illustrating my invention, the figure shows, in elevation, a plant or apparatus for carrying out my invention.

As shown in the drawing, six extractors, designated, respectively, 1, 2, 3, 4, 5, and 6, are employed, although any other number may be used. Each extractor comprises an air-tight vessel $a$, having a cover or manhole $b$ for the introduction of material to be treated and a manhole or other outlet $c$ for the removal of the spent material. The vessel is surrounded by a a steam-jacket $d$. The admission of steam to the steam-jacket is controlled by a pipe $e$, having therein a valve, and the water of condensation is withdrawn through pipe $f$. The vessels $a$ may be provided with internal perforated false bottoms. The extractors so constructed are not original with me, but are well known.

$g$ is a line-pipe having the outlets $g'$, one to each extractor, and these outlets $g'$ are provided with valves $g^2$.

$g^3$ is an inlet-pipe into the line-pipe $g$, having the valve $g^4$. This pipe $g^3$ is connected with a supply-tank which contains the solvent to be used in the extractors.

$h$ is another line-pipe arranged below the extractors and leading to the solvent-tank and connected with each of the extractors by means of a branch pipe $h'$, in which is a valve $h^2$, the said branch pipes opening from the bottom of the said extractors.

The solvent-tank, into which the pipe $h$ leads, may have any suitable separator for separating the solvent from the water, and the solvent may be prepared for further use.

An overhead line-pipe $i$ is connected with each of the extractors by means of the branch pipes $i'$, in which are valves $i^2$, and this line-pipe $i$ is connected with a condenser $j$ by means of a branch pipe $j'$. In the instance shown the condenser consists of coils of pipe $j^2$, arranged in a water-tank $j^3$ and provided with a manifold $j^4$, from which descends a pipe $k$, which is provided with the trap $k'$, to prevent backflow, said trap being connected with the line-pipe $g$, so that the vapor of the solvent, rising from the extractors, passes through the pipes $i'$ to the line-pipe $i$ and thence to the condenser, where it is condensed and whence it is returned through pipe $k$ and trap $k'$ through the line-pipe $g$ to the operatively first of the series of extractors, and thence successively to the several extractors of the series. Still another line-pipe $l$ is erected above the extractors and connected with each by means of a pipe $l'$, which is provided with a valve $l^2$, the pipe $l$ leading into a suitable condenser $l^3$, discharging through pipe $l^4$ into the solvent return-pipe $h$.

At the conclusion of the process the supply of solvent is cut off and the extractors drained through pipes $h'$ and valves $h^2$, and then steam may be admitted through pipes $m$ into the several extractors to drive off any remaining solvent, such as that adhering to the rock, the vapors escaping through the pipes $l'$ into the pipe $l$ and being condensed and conveyed away through pipe $h$ to the solvent-tank before described.

Each extractor is provided with a pipe $n$, having a valve $n'$. Beyond this valve the pipe $n$ has a down-pipe $o$, which leads into the line-pipe $o'$, which in turn opens into a receiver or storage-tank or distilling apparatus. The pipes $o$ are provided with valves $o^2$, so that the pipes $o$ may be cut off from their respective extractors.

The bottom of the first extractor in the series is connected with the upper portion of the next extractor by pipes $p\,p'$, the latter opening into the pipe $n$ beyond the valve $n'$. The several succeeding extractors are similarly connected. The first extractor is connected with the last by the pipe $p^2$. Each of the pipes $p$ is provided with a petcock $p^3$, by means of which samples of the solution may be taken from time to time to ascertain its character.

In order to prevent siphoning and to insure the flow or circulation through the apparatus or plant, the pipes $n$ may be provided with venting or equalizing pipes $r$, opening into the pipe $i$, the system being vented by means of the pipe $s$, which may be provided with a check-valve to admit atmospheric air whenever there is any tendency to siphoning.

Confining the description of the operation to the treatment of bituminous rock of the character hereinbefore mentioned, the rock is crushed and all of the extractors are filled with such crushed rock. The solvent (such as naphtha or benzin) is admitted through pipe $g^3$ into the line-pipe $g$ and thence passes into the first of the series of extractors, (in this instance extractor 1,) the valves $g^2$ of all of the other extractors being closed against the admission into them of the solvent through the other branch pipes $g'$. The valve $n'$ of extractor 1 is closed, while the similar valves $n'$ of the other extractors are opened, and the solvent then flows from extractor 1 through pipes $p\,p'$ and valve $n'$ of extractor 2 into said extractor 2 and from extractor 2 through its pipes $p\,p'$ and valve $n'$ of extractor 3 to that extractor, and so on from 3 to 4 and from 4 to 5 and from 5 to 6 and from 6 back through pipe $p^2$ to the overflow-pipe $o$ of extractor 1, and the valve $o^2$ of that pipe being open the solvent charged with the bitumen taken up by it in its flow through the series of extractors descends through said pipe $o$ into the main line-pipe $o'$, which conducts it to storage vessels or suitable distilling apparatus. (Not shown.) While the valve $o^2$ of extractor 1 is open, the similar valves of the other extractors are closed. Heat having been applied to the several extractors by introduction of steam into their steam-jackets a temperature is maintained equal to the boiling-point of the solvent, and the vapors, rising from the solvent in the several extractors, pass through the branch pipes $i'$ to the line-pipe $i$ and to the condenser, whence they are returned through the line-pipe $g$ to the initial extractor, thereby causing a constant circulation of the solvent and a continuous flow of bituminous solution from the first to the last of the extractors of the system.

The desired degree of concentration of the bituminous solution is obtained by regulating the supply of solvent by valve $g^4$, more solvent being admitted if a weak solution be desired, while less solvent will give a solution of greater concentration. The supply of fresh solvent through pipe $g^3$ to the first extractor of the series causes the bituminous solution to flow out of the last extractor through pipe $p^2$, as before described.

When the rock of the extractor 1 is exhausted of bitumen, as may be ascertained at the petcock $p^3$, that extractor is cut out of the series by closing the valves $g^2$, $i^2$, $n'$, and $o^2$. Then the solvent is drained off through pipe $h'$ and line-pipe $h$ into the receptacle (not shown) for the solvent by opening valve $h^2$. The valve $l^2$ is opened and live steam is admitted into the extractor through the valve $m$ to drive off any remaining solvent through the pipe $l'$ to the condenser $l^3$. The exhausted or spent rock may then be withdrawn through the outlet $c$ and afterward the extractor filled with fresh rock and admitted again into the series as the last of the series from which the bituminous solution is finally discharged.

Whenever one of the extractors is cut out of the series, the next extractor in series becomes the first of the series and the treatment carried on uninterruptedly in the remaining extractors of the series; and the operations just described may be carried on with each and every one of the several extractors in the series, so that the process is a continuous one and may be carried on indefinitely.

The solvent containing the least bitumen is lighter than the solution containing more, and hence as the solvent flows from the bottom of one extractor to the top of the other the most saturated solvent goes over first, and as the contents of each succeeding extractor are heavier than those of the one next preceding it follows that the lighter solvent will float on the surface and then slowly but surely move the heavier solution toward the bottom and cause it to flow over to the next extractor. Furthermore, as stated, the bottom of each extractor having a perforated false bottom (on which a layer of excelsior or like stuff is placed) the concentration commences thereupon, so that all of the solvent which passes out of the extractor below the false bottom is filtered and keeps the concentrated substance free from sediment, which would tend to obstruct the outlets. Perfect extraction of the rock from the bottom up would hardly be possible without large quantities of the solvent while operating, as described, from the top downwardly, the fresh solvent flowing in on top and, lighter than the contents of the extractor, displaces perfectly all the lower strata of the more saturated solvent.

The solution of bitumen or asphalt in benzin or other solvent that may be employed is carried off and submitted to a refining or final-separation process in another apparatus—such, for example, as that forming the subject of another case of mine, filed October 23, 1896, Serial No. 609,837, and entitled "Apparatus for the continuous fractional distillation of hydrocarbons."

From the foregoing it will be perceived that two operations proceed contemporaneously—namely, first, there is a continuous circulation of hot solvent produced by the introduction of the initial charge of solvent and the return to the system of the condensed vapors thereof, and, second, a constant flow of the solution from one extractor to another is caused by the return of the condensed or addition of fresh solvent to the first extractor of the series.

As already indicated, the invention is applicable to the extraction of cotton-seed oil and also linseed-oil, and I mean to include in my claims all such and similar uses to which the invention may be applicable, any phraseology in the claims to the apparent contrary.

What I claim is—

1. The method of extracting bitumen from bituminous rock, which consists in exposing the rock in a series of closed and heated vessels to the action of a solvent, at a temperature less than the boiling-point of bitumen and at or above the boiling-point of the solvent, flowing the solution through the series of rock-filled vessels, from one end of the series to the other, condensing the vaporized solvent and returning it to either of the vessels, whereby a continuous circulation of the solvent is produced simultaneously with the onflow of the solution, and the solution finally concentrated in the last of the series of vessels, substantially as described.

2. An apparatus for extracting bitumen from bituminous rock, comprising a series of similar vessels and means to heat them, a feed-pipe for introducing a solvent into one of such vessels, pipe connections for overflowing the solvent from the first vessel in the series successively through the others to the last, pipes for the escape of the vaporized solvent, a condenser for such vapors, and means to return the condensed solvent to the first vessel of the series whence it passes to the others as at first, whereby the bituminous solution flows from the first vessel successively through the others to the last vessel of the series where it is concentrated until the desired density is obtained, substantially as described.

3. An apparatus for extracting bitumen from bituminous rock, comprising a series of similar vessels, and means to heat them, a feed-pipe for introducing a solvent into one of such vessels, pipe connections for overflowing the solvent from the first vessel in the series successively through the others to the last, pipes for the escape of the vaporized solvent, a condenser for such vapors, means to return the condensed solvent to the first vessel of the series whence it passes to the others, whereby the bituminous solution from the first vessel flows successively through the others to the last vessel of the series, where it is concentrated until the desired density is obtained, and means for cutting out of the series any one of the vessels whose rock has been freed from bitumen, substantially as described.

4. An apparatus for extracting bitumen from bituminous rock, comprising a series of similar vessels and means to heat them, a feed-pipe for introducing a solvent into one of such vessels, pipe connections for overflowing the solvent from the first vessel in the series successively through the others to the last, pipes for the escape of the vaporized solvent, a condenser for such vapors, means to return the condensed solvent to the first vessel of the series whence it passes to the others, the bituminous solution from the first vessel being thereby flowed successively through the others to the last vessel of the series, where it is concentrated until the desired density is obtained, means for cutting out of the series any one of the vessels whose rock has been freed from bitumen, and means for driving off and recovering the solvent adhering to the rock, substantially as described.

In testimony whereof I have hereunto set my hand this 16th day of October, A. D. 1896.

HANS A. FRASCH.

Witnesses:
HENRY A. TOBELMAN,
F. STORER BROWN.